United States Patent [19]

Török et al.

[11] Patent Number: 5,012,159
[45] Date of Patent: Apr. 30, 1991

[54] ARRANGEMENT FOR TRANSPORTING AIR

[75] Inventors: Vilmos Török, Lidingö; Andrzej Loreth, Åkersberga, both of Sweden

[73] Assignee: Astra Vent AB, Stockholm, Sweden

[21] Appl. No.: 438,427

[22] PCT Filed: Jul. 1, 1988

[86] PCT No.: PCT/SE88/00365
§ 371 Date: Nov. 15, 1989
§ 102(e) Date: Nov. 15, 1989

[87] PCT Pub. No.: WO89/00355
PCT Pub. Date: Jan. 12, 1989

[30] Foreign Application Priority Data

Jul. 3, 1987 [SE] Sweden .................................. 8702752

[51] Int. Cl.⁵ .......................... H01J 7/24; H01T 23/00
[52] U.S. Cl. ................................ 315/111.91; 361/230; 361/231; 250/324
[58] Field of Search ................. 315/111.81, 111.91; 361/230, 231, 213; 250/423 R, 431, 324

[56] References Cited

U.S. PATENT DOCUMENTS

| | | | |
|---|---|---|---|
| 4,231,766 | 11/1980 | Spurgin | 361/230 X |
| 4,317,661 | 3/1982 | Sasaoka et al. | 361/231 X |
| 4,364,752 | 12/1982 | Fitch et al. | 361/230 X |
| 4,380,720 | 4/1983 | Fleck | 315/111.91 |
| 4,521,229 | 6/1985 | Baker et al. | 361/230 X |
| 4,602,921 | 7/1986 | Schinohara et al. | 361/230 X |
| 4,812,711 | 3/1989 | Török et al. | 315/111.91 |

Primary Examiner—Eugene R. LaRoche
Assistant Examiner—Do Hyun Yoo
Attorney, Agent, or Firm—Browdy and Neimark

[57] ABSTRACT

An arrangement for transporting air, with the aid of an ion-wind, includes a corona electrode (K) at least one target electrode (M) located at a distance from the corona electrode, and a d.c. voltage source (4) connected between the corona electrode and target electrode. The arrangement includes a housing (1, 5) with an inlet opening (2) in which the corona electrode (K) is disposed centrally, and an air-flow path extending from the inlet opening and containing the target electrode (M). The target electrode is located spaced form and symmetrical with the center line through the inlet opening. The housing is configured so that the air-flow path downstream of the inlet opening (2) and the corona electrode (K) branches outwardly towards the target electrode (M), thereby forcing air entering through the inlet opening (2) out towards the target electrode (M) and preventing at least the major part of this air-flow from continuing straight forwards along the extension of the center line.

24 Claims, 5 Drawing Sheets

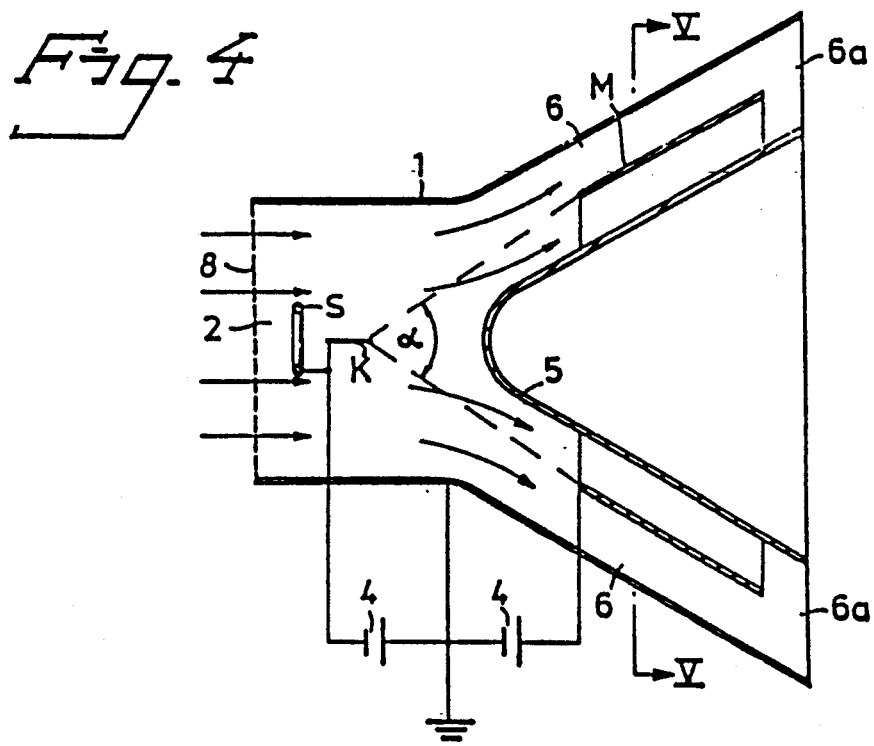
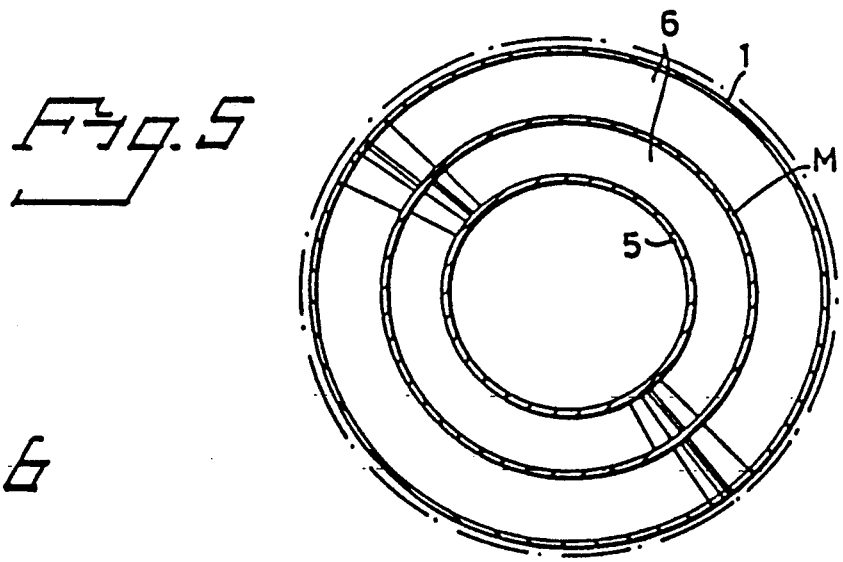
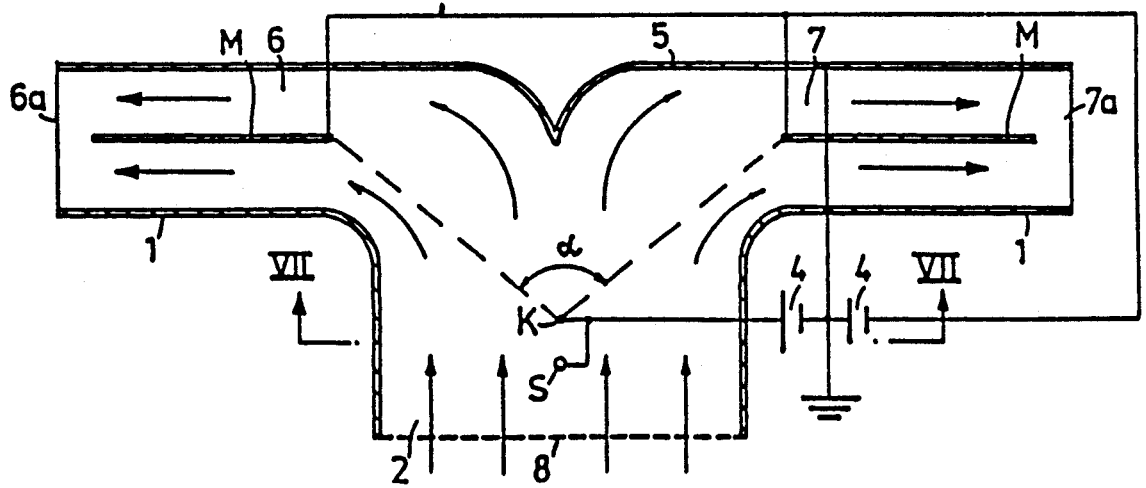

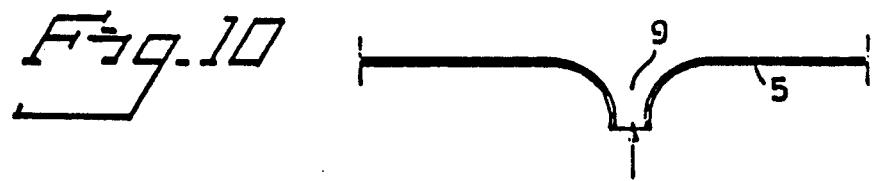
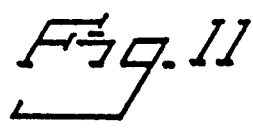
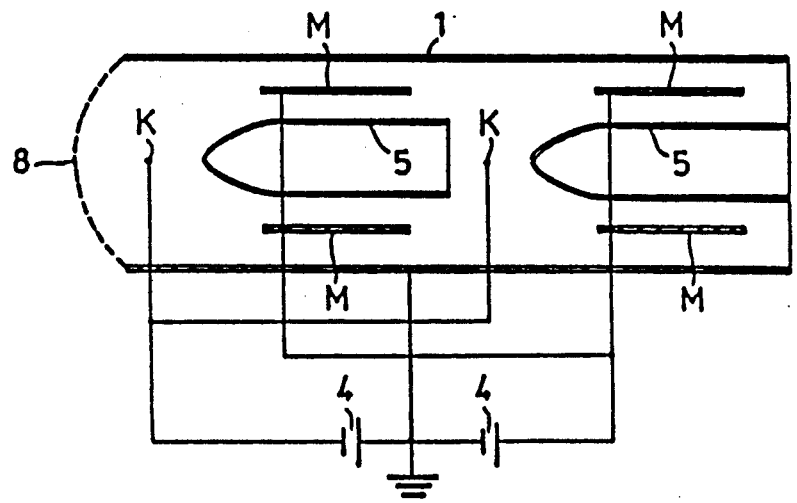
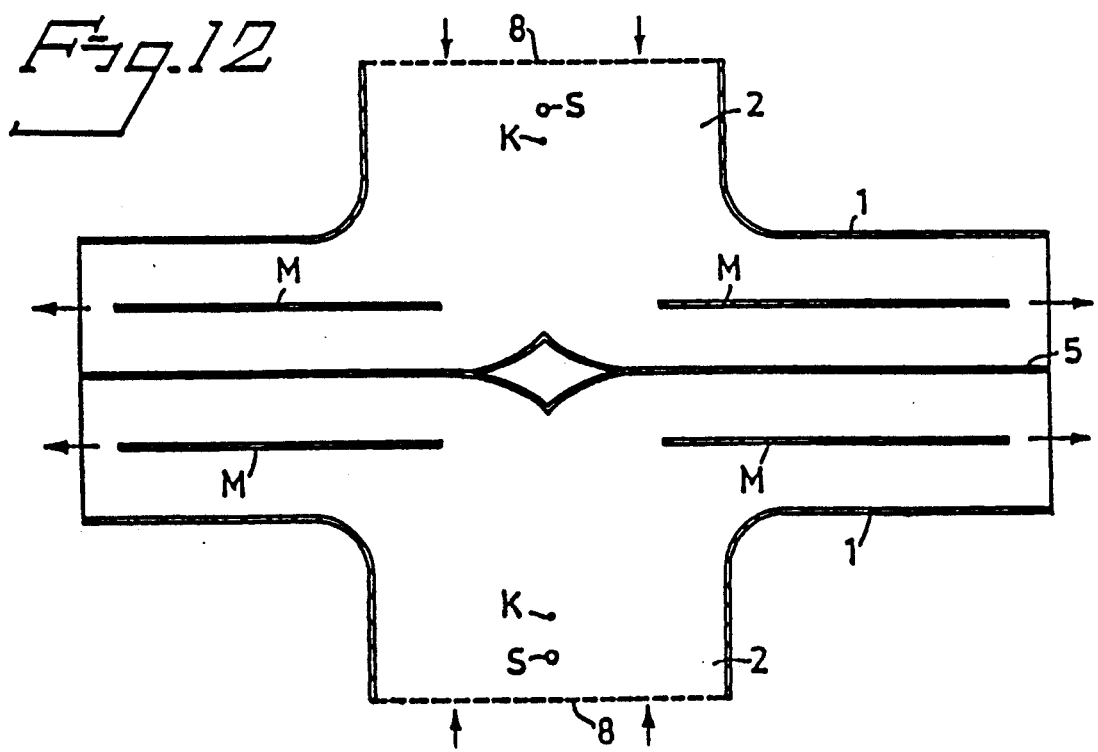

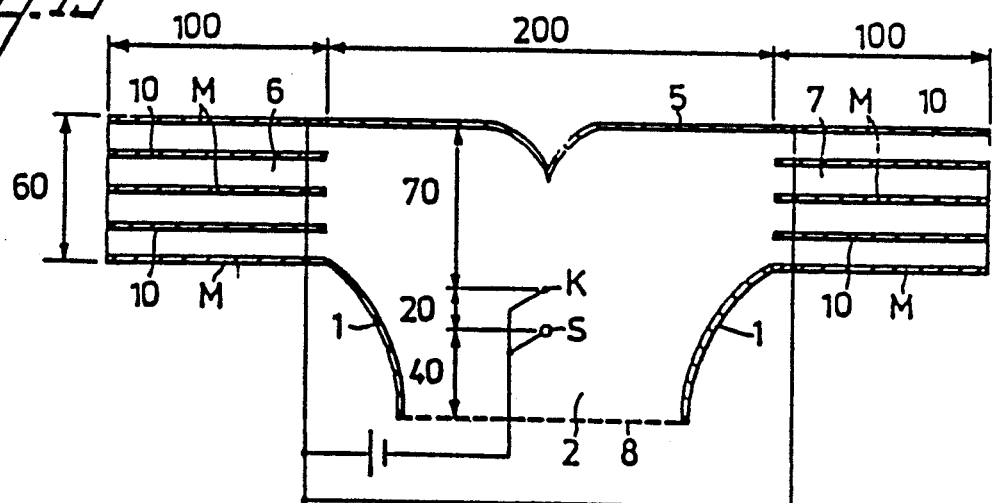
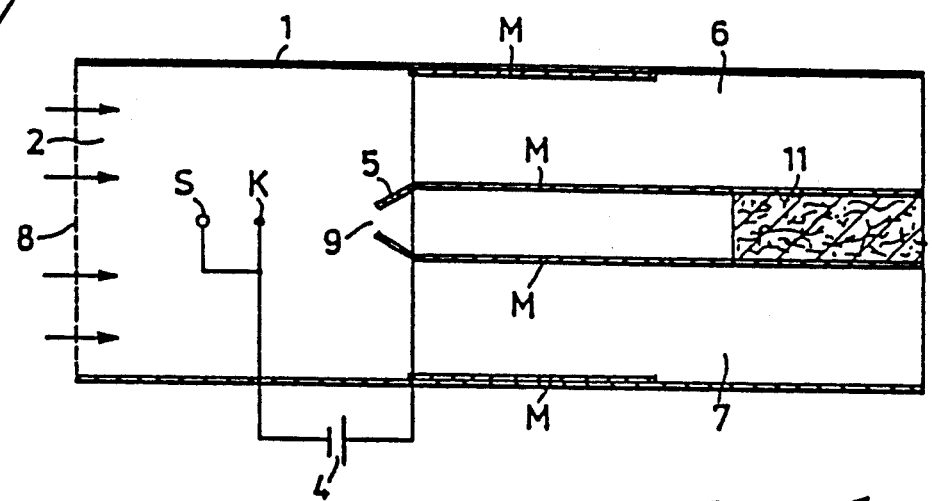
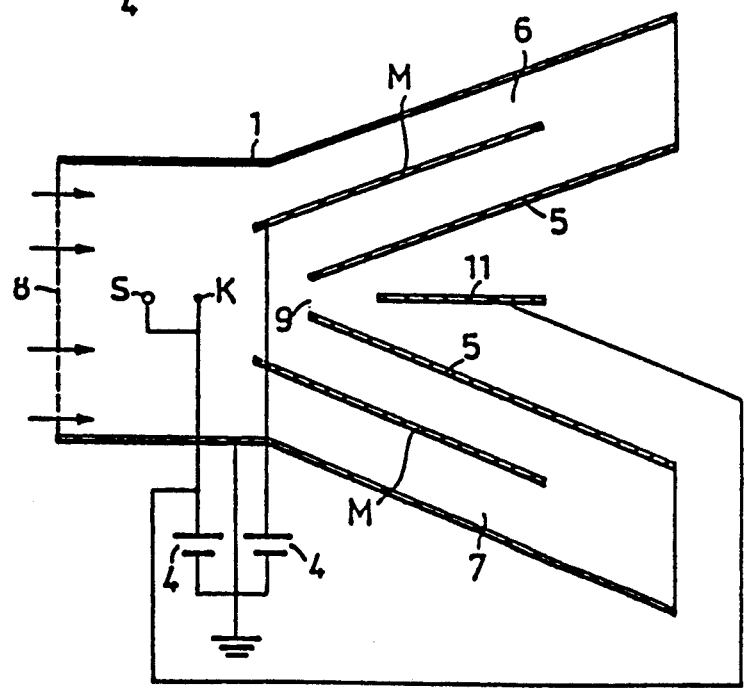

ARRANGEMENT FOR TRANSPORTING AIR

BACKGROUND OF THE INVENTION

1. Field of the Invention

The present invention relates to an arrangement for transporting air with the aid of a so-called electric ion or corona wind, and preferably cleansing the air at the same time.

2. The Prior Art

It is known that air can be transported with the aid of a so-called electric ion wind or corona wind. In principle, such an arrangement comprises a corona electrode and a target electrode which are mutually spaced apart and each of which is connected to a respective terminal of a d.c. voltage source, the configuration of the corona electrode and the potential difference and also the distance between the corona electrode and the target electrode being such as to generate at the corona electrode a corona discharge which produces air ions. These air ions migrate rapidly to the target electrode, under the influence of the electric field between the corona electrode and target electrode, and give their electric charge to the target electrode. During their movement towards the target electrode, the ions collide with electrically neutral air molecules, thereby also transferring the electrostatic forces to these latter molecules, so that they are also entrained towards the target electrode, thereby establishing air transportation in the form of a so-called ion or corona wind. Air transporting arrangements of this kind are found described, for instance, in international patent application PCT/SE85/00538.

When the air contains contaminant aerosols, i.e. suspended solid particles or liquid droplets, these contaminants will be charged electrically by the air ions generated by the corona discharge, and hence the contaminants, or impurities, can be precipitated electrostatically on the target electrode, provided that the electrode is suitably configured, or in a capacitor separator located downstream of the target electrode. Thus, it is possible in principle to provide an air cleansing arrangement with which air can be transported through the arrangement and contaminant aerosols extracted from the air with the aid of the air ions produced by a corona discharge.

The ability to produce in practice such an arrangement which will satisfy the requirements desired thereof, such as large volumetric air throughflows, high cleansing ability, small dimensions, reasonable potential difference between corona electrode and target electrode, and therewith reasonable high voltage levels, and a corona current which has an acceptable value with regard to the harmful gases generated by the corona discharge, particularly ozone and oxides of nitrogen, has been found to be associated, however, with several not-readily solved and closely related problems. Consequently, an arrangement of this kind which can be used in practice is not yet available commercially.

As disclosed in the aforesaid international patent application, it is possible to achieve both significant air-flow speeds and considerable volumetric air through-flows with the aid of a corona current which is acceptable with regard to the generation of ozone and other harmful gases, when the corona electrode and target electrode are located at a considerable distance apart and the corona electrode is screened effectively, so that the product of ion current and ion-migration distance in an upstream direction away from the corona electrode is negligibly small. An increase in the distance between corona electrode and target electrode, however, requires an increase in the potential difference between corona electrode and target electrode, in order to ignite the corona electrode effectively. The consequence hereof is an increase in high voltage levels of the corona electrode and/or target electrode, which in turn results in insulating and spark-over problems. In addition hereto, the need to prevent unintentional touching of the high-voltage electrodes is also increased. When the corona electrode and target electrode are spaced axially from one another in a straight air flow duct or passageway, which is primarily the most natural arrangement, it has been found that the air flow has a marked tendency to concentrate in the central part of the duct. This applies even when the target electrode is located as close to the walls of the duct as possible. Therefore, the requirement for a large volumetric air throughflow requires a flow duct of wide area, and consequently the arrangement must be given large dimensions. Furthermore, when the target electrode is placed adjacent the duct walls it is necessary to insulate the inner surfaces of the walls electrically. It has been found, however, that when the arrangement is in operation the electrically insulated wall surfaces obtain an electrostatic charge which disturbs the corona discharge and the corona electrode in a troublesome manner, preventing the electrode from igniting in the manner intended. Furthermore, positioning of the target electrodes adjacent the duct walls means, in conjunction with the essentially laminar flow of the air in the air flow duct, that the path along which the electrically charged aerosol contaminants have to migrate to the target electrode surfaces becomes relatively long, and hence the extent to which the air is cleansed is relatively low. In principle, it is possible to obtain an improvement in this regard by increasing the axial lengths of the target electrode surfaces, or primarily by using either a large number of mutually parallel and less widely spaced target electrode surfaces with intermediate electrode surfaces of opposite polarity, or a conventional capacitor separator downstream of the target electrode in the air-flow channel. All of these solutions, however, require a substantial increase in the total dimensions of the arrangement and, from the aspect of achieving the most effective cleansing effect, the two last mentioned solutions also result in a substantial increase in flow resistance in the duct. This increased flow resistance must, in turn, be compensated for by increasing the corona current and/or the distance between corona electrode and target electrode, an increase in corona current resulting in an increase in the amount of ozone and other harmful gases generated, and both solutions also requiring a greater potential difference between the electrodes. Consequently, it has been found very difficult to provide with an arrangement of this kind a satisfactory air transporting apparatus which will simultaneously cleanse the air transported, when air transportation is effected with the aid of an electric corona-wind or ion wind.

The object of the present invention is therefore to provide to this end an arrangement which is not encumbered with the aforementioned problems, or with which these problems are at least greatly reduced, and to provide an arrangement which will fulfill the aforesaid requirements in a satisfactory manner.

It has surprisingly been found that this object is achieved by means of an arrangement constructed in accordance with the following claims.

BRIEF DESCRIPTION OF THE INVENTION

The invention will now be described in more detail with reference to a number of exemplifying embodiments of the invention and with reference to the accompanying drawings, in which FIG. 1 is a schematic and axial sectional view of an earlier proposed embodiment of an arrangement for transporting and optionally simultaneously cleaning air with the aid of an electric ion-wind or corona-wind;

FIG. 4 is a schematic and axial sectional view of a second embodiment of an arrangement according to the invention;

FIG. 5 is a sectional view of the arrangement shown in FIG. 4, taken on the line V—V;

FIG. 6 is a schematic and axial sectional view of a third embodiment of an arrangement according to the invention;

FIG. 10 illustrates schematically a part of a conceivable embodiment of part of an arrangement according to the invention;

FIG. 11 is a schematic, sectional view of the same kind as that of FIG. 2, but illustrates still a further embodiment of an arrangement according to the invention;

FIG. 12 is a schematic sectional view of the same kind as that shown in FIG. 6, but illustrates another embodiment of an arrangement according to the invention;

FIG. 13 is a schematic sectional view of the same kind as that shown in FIG. 6, but illustrates another embodiment of an arrangement according to the invention; and FIGS. 14 and 15 each illustrates schematically embodiments of arrangements according to the invention provided with particular means for removing harmful gases generated by the corona discharge.

DETAIL DESCRIPTION OF THE PREFERRED EMBODIMENT

Figure 1:
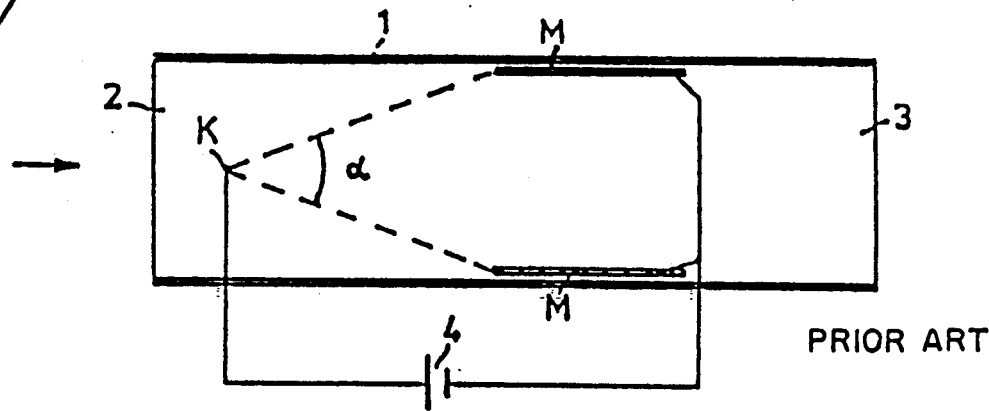

FIG. 1 illustrates very schematically and in axial section an earlier proposed embodiment of an arrangement for transporting air, optionally while simultaneously cleansing the air of contaminants in aerosol form, with the aid of an electric ion-wind or corona-wind. This arrangement comprises a housing 1 in the form of a straight air-flow duct of constant cross-section and having at one end an inlet opening 2 and at the other end an outlet opening 3. It is assumed that the illustrated housing or air-flow duct 1 has a rectangular cross-sectional shape. Arranged in the duct 1, in the vicinity of the inlet opening 2, is a corona electrode K, which has the form of a thin wire extending transversely across the duct 1 in the centre plane through the duct. Arranged downstream of the corona electrode K is a target electrode in the form of two mutually parallel, thin-gauge electrodes M which extend in the longitudinal direction of the duct 1 and in the direction of the air flow, these electrodes M being located adjacent to or on the inner surface of mutually opposing duct walls. By thin-gauge target electrode is meant here and in the following an electrode whose thickness or gauge is very much smaller than the surface area of the electrode in its axial extension. The corona electrode K and the target electrode M are each connected to a respective terminal of a d.c. voltage source 4, the potential of which is such that a corona discharge is generated at the corona electrode K. This corona discharge generates air ions which migrate towards the target electrodes M, therewith engendering a flow of air through the duct 1 in the direction of the arrow shown, as described in the aforementioned international application.

Contaminants in aerosol form, i.e. solid particles or liquid droplets suspended in the air, will be charged electrically by the ions generated with the corona discharge, and consequently these contaminants will strive to wander or migrate to the target electrodes M, where they precipitate out onto the electrode surfaces, therewith, in principle, enabling the through-flowing air to be cleansed. The air-flow duct 1 of such an earlier proposed arrangement may also have circular cross-section. In this case, the corona electrode comprises a short needle-like electrode which extends axially along the centre axis of the duct, and the target electrode has the form of a cylindrical surface.

However, as mentioned in the introduction, a practical realization of a really effective air transporting and air cleansing arrangement of this earlier proposed construction presents significant problems and problems which are not readily solved. It will be understood from the aforementioned international patent application, that it is possible to achieve significant air flow speeds and volumetric air through-flows with the aid of corona currents which can be accepted with regard to the undesirable generation of ozone, provided that the corona electrode K and the target electrode M are spaced substantially wide apart, and provided that the corona electrode K is effectively screened in an upstream direction, so that the product of any ion current from the corona electrode K in an upstream direction and the length of the path along which this ion current travels is negligibly small. An increase in the distance between the corona electrode K and the target electrode M, however, requires a greater potential difference, in order to achieve effective and stable ignition or firing of the corona electrode, and consequently higher voltage levels on the electrodes, therewith introducing difficulty solved insulation and over-spark problems. Furthermore, the high voltage levels on the electrodes renders it difficult to make the arrangement safe to touch. Naturally, when a high-voltage target electrode M is placed close to or on the inner surface of the duct walls, it is necessary to ensure that the inner surfaces of the walls is electrically insulating. The provision of electrically insulating inner surfaces on the duct walls, however, results in a significant electrostatic charge which disturbs the corona discharge at the corona electrode in a very troublesome manner. It might be conceivable, in principle, to earth the target electrode M and to make the duct walls 1 electrically conductive and earth the walls. In this case, however, the voltage level of the corona electrode K relative to earth will be still higher, thereby making the insulation and spark-over or flashover problems still more difficult. Furthermore, this solution would make it more difficult to effectively screen the corona electrode in an upstream direction. Neither would it improve matters by positioning the target electrode M at a distance from the duct walls such as to enable said walls to be made electrically conductive and earthed without risk of spark-over between the duct walls and the target electrode, since it has been found that the air flow concentrates completely to the space located inwardly of the target electrodes, and that no air flow occurs in the space between the target electrode and duct wall. In actual fact, it is possible, under certain conditions, to obtain in said space an air flow in the opposite, non-desired direction. In general, the air flow engendered with the earlier proposed arrangement illustrated in FIG. 1 and described in the aforegoing has a strong tendency to concentrate in the central part of the air flow duct, and consequently the flow velocity distribution in the duct becomes very uneven. This results in poor use of the duct area and also makes it difficult for the finely-divided contaminants suspended in the air to migrate to and precipitate on the target electrode M in time, resulting in poor cleansing of the air. As mentioned in the introduction, the extent to which the air is cleansed can be slightly improved by increasing the axial extension of the target electrode or by arranging a plurality of target-electrode surfaces in mutually parallel and mutually adjacent relationship in the air duct 1, or by providing a conventional capacitor separator downstream of the target electrode. All of these solutions, however, involve extending the dimensions of the arrangement and/or result in the introduction of a greater resistance to air flow, which resistance must be compensated for by increasing the corona current and/or the distance between corona electrode and target electrode, and therewith the potential difference. As beforementioned, an increase in corona current and an increase in potential difference, and therewith higher voltage levels in the arrangement, are highly undesirable.

It has been found possible to achieve a more effective and more stable ignition of the corona discharge at the corona electrode with reduced potential difference between a corona electrode and target electrode, or increased distance between corona electrode and target electrode with the potential difference maintained, when the distance between the two target electrodes M in the FIG. 1 embodiment or the diameter of a cylindrical target electrode in the case of an embodiment in which the duct is of circular cross-section, is increased so that the angle at which the corona electrode "sees" the target electrode is also increased. This angle is designated α in FIG. 1. When, however, the distance between the target electrodes M is increased, for instance in the earlier proposed embodiment illustrated in FIG. 1, so that the angle α is increased, the air flow will still concentrate essentially to the central part of the duct 1, and consequently it will be still more difficult to achieve effective precipitation of the air-borne contaminants on the surfaces of the target electrodes M. Furthermore, it is found that although ignition of the corona discharge and the corona electrode is improved when the angle α is increased above a certain value, the air flow through the arrangement is progressively worsened at the same time. The reason for this is believed to be because the force driving the air flow, or the pressure set-up, is directed parallel with the ion current passing from the corona electrode K to the target electrode M, and consequently the force component acting in the direction of air flow parallel with the duct axis becomes progressively smaller with increasing values of the angle α.

It has been found possible to reduce to a considerable extent all of the aforedescribed problems by means of the present invention, and also to provide an effective and useful arrangement for transporting and simultaneously cleansing air with the aid of an electric ion-wind or corona-wind.

Figure 2:
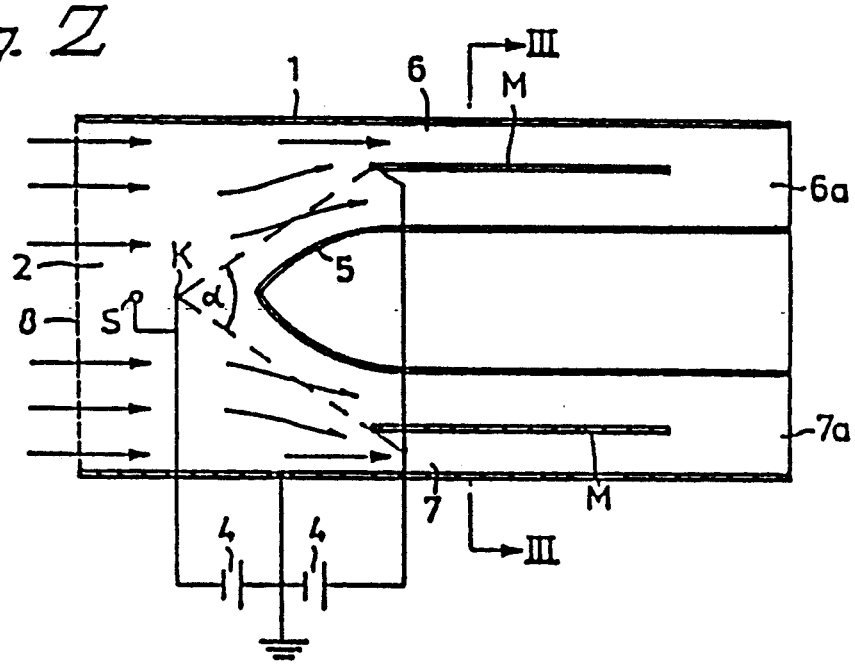
FIG. 2 illustrates schematically and in axial section a first embodiment of an arrangement according to the invention.
Figure 3:
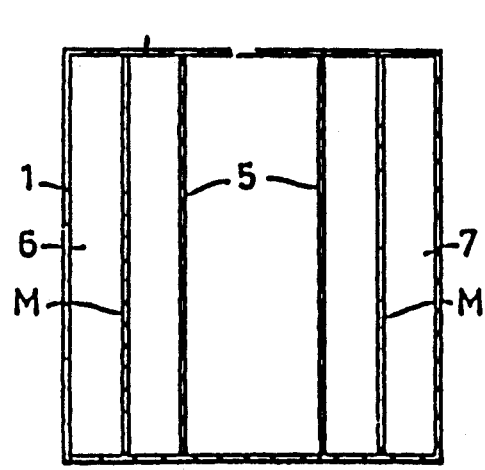
FIG. 3 is a schematic sectional view of the arrangement shown in FIG. 2, taken on the line III—III.

FIGS. 2 and 3 illustrate schematically, and by way of example, a first embodiment of an inventive arrangement. Similar to the known arrangement illustrated in FIG. 1, this inventive embodiment comprises a housing 1 having an inlet opening 2 of rectangular cross-section in which a corona electrode K in the form of a thin wire is positioned in the centre plane through the opening 2. The illustrated arrangement also includes two, flat and thin target electrodes M which are arranged parallel with one another and with the centre plane through the inlet opening 2, at a substantial distance from and symmetrically on opposite sides of said centre plane, so that the angle α at which the corona electrode K sees the two target electrodes M has a significant value. In the case of an inventive arrangement, this angle α may advantageously be at least 60° and may even be much greater than 60°, and in the case of certain inventive embodiments may be as large as almost 180°, as will be made evident from the following description. This results in highly effective and stable ignition of the corona discharge at the corona electrode K with the aid of a moderate potential difference between the corona electrode and the target electrode, even though the distance between the corona electrode and the target electrodes is significant. It should be observed in this regard that by "the distance between the corona electrode and the target electrodes" is meant the path along which the ions migrate from the corona electrode to the target electrodes, i.e. the length of the broken lines in FIG. 2. As beforementioned, the magnitude of the air-current driving forces is contingent on the length of the path migrated by the ions together with the strength of the ion current.

The inventive embodiment illustrated in FIGS. 2 and 3 differs from the earlier proposed embodiments, e.g. the embodiment illustrated in FIG. 1, in that the housing 1 is provided with a partition wall or intermediate wall 5, which is so configured that the air flow path downstream of the corona electrode K is branched symmetrically outwards on both sides of the centre plane through the inlet opening 2, such as to form two, mutually separate through-flow channels 6 and 7 which are located at a substantial distance from the centre plane through the inlet opening 2, the target electrodes M being located in the two channels 6 and 7. This arrangements prevents the air-flow entering through the inlet opening 2 from continuing straight forwards in the vicinity of the centre plane through the inlet opening 2, the air-flow instead being forced out towards the target electrodes M and caused to move past the electrodes in the airflow channels 6 and 7. Despite that this arrangement deflects the air-flow and causes it to change direction, it has been surprisingly found that a much more effective and greater air-flow is obtained through the arrangement. It is believed that this is because the direction in which the air flows coincides to a very great extent with the direction of the forces driving the air-flow, these forces being generated by the ion current passing from the corona electrode K to the target electrodes M. This fact, together with the fact that the angle α can be made large so that an effective and stable ignition of the corona discharge can be achieved with the aid of the moderate potential difference while using, at the same time, a relatively long distance between the corona electrode and the target electrodes, enables an arrangement to be produced which will transport air very effectively with the aid of a reasonable potential difference between the electrodes and a corona current which can be accepted with regard to the production of ozone.

Furthermore, because the air-flow is forced out into the immediate vicinity of the target electrodes M and moves on both sides of the thin-gauge target electrodes, when these are placed substantially centrally in the air-flow channels 6, 7 as shown in FIGS. 2, 3, precipitation of the suspended contaminants onto the target electrode surfaces is much more effective. Deflection of the air-flow also results in a certain amount of turbulence in the channels 6, 7, which further improves the contact of the air with the target electrodes M and therewith renders precipitation of the contaminants still more effective. The position of the target electrodes M in the channels 6, 7 may be varied, so as to obtain a desired air-flow on both sides of the target electrodes.

An advantage is afforded when the d.c. voltage source 4 to which the corona electrode K and the target electrodes M are connected has an earthed central terminal, so that the corona electrode and the target electrodes obtain opposite polarities in relation to the earth and therewith lower voltage levels relative to earth. Since the target electrodes M are arranged at a distance from the side walls of the housing 1 and the intermediate or partition wall 5, these walls may be electrically conductive and earthed. This means that these walls are safe to touch and cannot be charged electrostatically, and therewith give rise to corona discharge disturbance at the corona electrode K. Although not shown in the drawing, the corona electrode K and the target electrodes M are advantageously connected to the voltage source 4 through very large resistances which limit short circuit currents to safe values in the event of one of the electrodes short circuiting.

Since the major part of the ion current from the corona electrode K passes to the edges of the thin-gauge target electrodes M located nearest the corona electrode K, only these target electrode edges need be electrically conductive, or semi-conductive, and connected to the voltage source. The remaining part of the thin-gauge target electrodes M, which part essentially functions solely as a precipitation surface for electrically charged contaminants suspended in aerosol form, may, on the other hand, have a very high resistivity, for example may comprise an anti-static material, or a material treated so as to become anti-static, having a resistivity in the order of $10^{10}$–$10^{13}$ ohms. These latter parts of the target electrodes M namely receive very little current, the amount of current received corresponding solely to the electric charge of the contaminants precipitated onto the target electrode surfaces. This construction of the target electrodes M renders the target electrodes quite safe to touch through the outlet openings 6a, 7a of the air flow channels 6, 7. If desired, the target electrode edges facing the corona electrode K may be rounded and made slightly thicker so as to enable said edges to receive and conduct away the ion current from the corona electrode more effectively, without risk of generating a corona, so-called back-corona, at the target electrodes. The configuration of these target electrode edges may also be adapted to the flow of air past said edges.

An advantage is also afforded when a screen electrode S is arranged upstream of the corona electrode and connected to a potential which is substantially the same potential as the corona electrode, so as to prevent ions migrating from the corona electrode in an undesirable direction. When the corona electrode K has the form of an elongated thin wire, similar to the embodiment illustrated in FIGS. 2 and 3, the screen electrode S may, for instance, have the form of a rod of relatively large diameter and extending parallel with the corona electrode K.

The inlet opening 2 is conveniently covered with a grid or net 8 which prevents unintentional contact with the screen electrode S and the corona electrode K. The grid or net 8 may be electrically conductive and therewith earthed in the same way as the side walls and partition wall 5 of the housing 1. When the net or grid 8 is located at a distance from the corona electrode K such that no ion current will tend to pass from the corona electrode K to the grid or net 8, the screen electrode S can be omitted and the grid or net made to provide the requisite screening effect.

The corona electrode K need not be positioned axially inwards of the inlet opening 2, as in the case illustrated in FIG. 2, but may be positioned in the plane of the inlet opening 2 or even axially outwards of said opening. In such cases the net or grid 8 is configured so as to also surround the sides of the corona electrode K and therewith prevent unintentional contact with the electrode.

As will be understood, an arrangement based on the aforedescribed principles illustrated in FIGS. 2 and 3 may also have a circular cross-section, i.e. a circular inlet opening 2. In this case, the corona electrode will consist of a straight wire or needle-like electrode positioned axially along the centre line passing through the inlet opening 2. Furthermore, in the case of this latter embodiment the two separate air flow channels 6 and 7 will have the form of a circular section air-flow channel which is located coaxially with and around the centre line passing through the inlet opening 2 and in which a cylindrical, tubular target electrode is placed.

FIGS. 4 and 5 illustrate schematically, in a manner similar to the FIGS. 2, 3 illustration, a further conceivable embodiment of an inventive arrangement having a circular-section inlet opening 2 and a short straight-wire or needle-shaped corona electrode K arranged axially along the centre line passing through the inlet opening 2. In this embodiment, the housing 1 and its partition wall 5 are configured so that the path taken by the air flow downstream of the corona electrode K forks symmetrically outward from the centre line passing through the inlet opening 2 to a circular-section air flow channel 6 which diverges conically in relation to the inlet-opening centre line. Arranged in the channel 6 is a thin-gauge, frusto-conical target electrode M, which extends essentially parallel with the channel walls and is located between said walls. It will be seen that an arrangement of this construction will, in principle, function in the same way as the earlier described arrangement illustrated in FIGS. 2, 3, and will afford the same advantages as said arrangement. It is possible that the air flow conditions are slightly more advantageous in the case of an arrangement constructed in accordance with FIGS.

4, 5, since the air flow channel 6 diverges outwards in substantially the same direction as the direction from the corona electrode K to the target electrode M. On the other hand, the total outer dimensions of an arrangement constructed in accordance with FIGS. 4, 5 will be larger than those of an arrangement constructed in accordance with FIGS. 2,3. Since the corona electrode K of the arrangement illustrated in FIGS. 4, 5 comprises a short straight-wire or needle-shaped electrode which extends axially, the screening electrode S will suitably have the form of a ring arranged upstream of the corona electrode K.

It will be understood that an embodiment incorporating the same principles as those illustrated in FIGS. 4, 5 can also be used in an arrangement having an inlet opening of substantially rectangular cross-section and therewith two, mutually separate air-flow channels of substantially rectangular cross-section (corresponding to the channels 6, 7 in FIGS. 2, 3) which diverge symmetrically in relation to the inlet-opening centre plane. In this case, each of the two air-flow channels will include a substantially flat thin-gauge target electrode similarly to the embodiment of FIGS. 2, 3, the corona electrode having the form of a wire and being arranged in a similar manner to that shown in FIGS. 2, 3.

Figure 7:
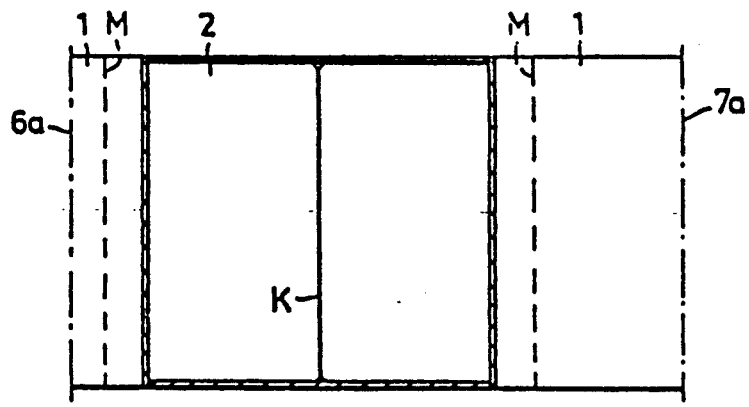
FIG. 7 is a sectional view of the arrangement shown in FIG. 6, taken on the line VII—VII.

FIGS. 6 and 7 illustrate schematically an extreme, and in many respects a highly advantageous embodiment of an inventive arrangement, in which the housing 1 and the partition wall 5, which in this particular case is substantially planar, are so configured that the path travelled by the air-flow downstream of the corona electrode K forks at substantially right angles into two oppositely directed air-flow channels 6 and 7, which thus extend substantially at right angles to the inlet-opening centre plane. It has been found that this embodiment will transport and cleanse the air very effectively. The angle α within which the corona electrode K sees the target electrodes M can, in this instance, be made very large and the corona electrode K may be placed substantially in the plane of the housing wall or immediately outwardly thereof, so that the inlet opening or inlet port 2 can be made very short.

Figure 8:
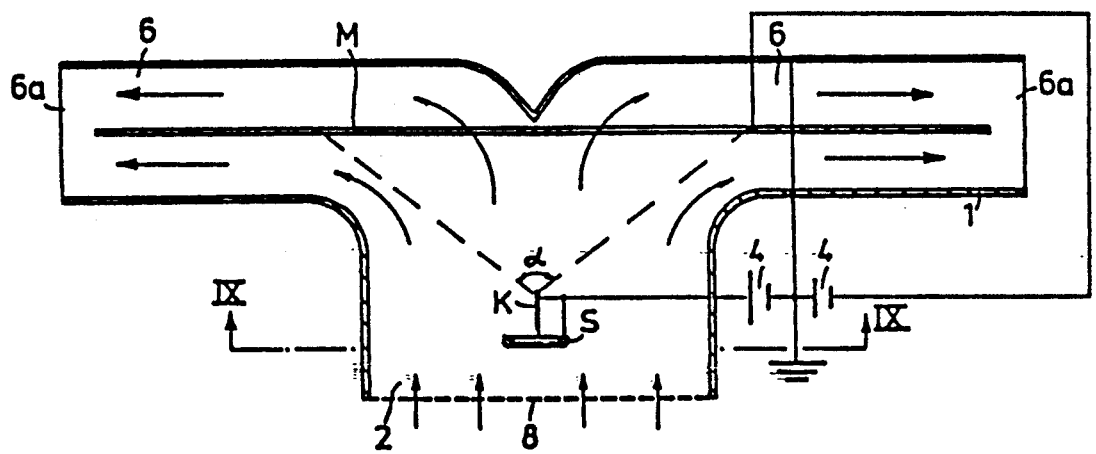
FIG. 8 is a schematic and axial sectional view of a further embodiment of an arrangement according to the invention.
Figure 9:
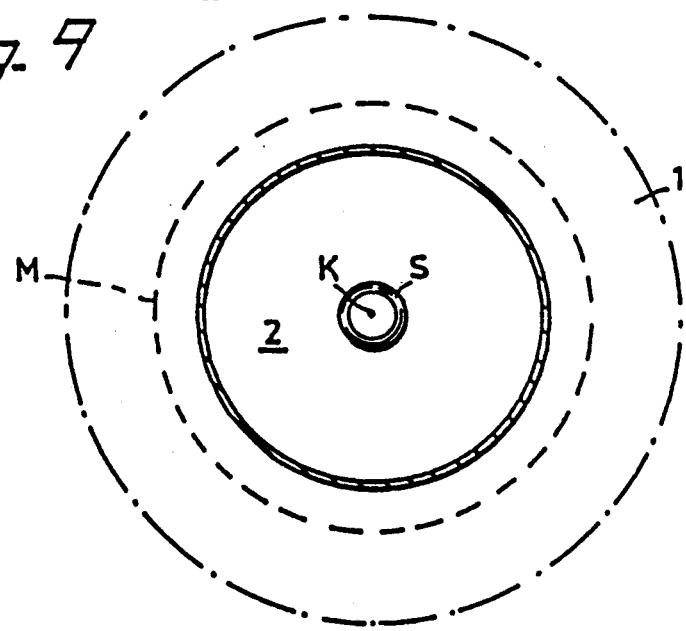
FIG. 9 is a sectional view of the arrangement shown in FIG. 8, taken on the line IX—IX.

FIGS. 8 and 9 illustrate schematically a similar embodiment having a circular inlet opening 2, and thus only a single air-flow channel 6, which extends radially in all directions, substantially perpendicularly to the inlet-opening centre line, and in which a substantially flat annular target electrode M is arranged.

Although the target electrode or target electrodes of all of the aforedescribed inventive arrangements is, or are, thin-gauged (i.e. of small thickness in relation to their surface area) and are arranged in parallel spaced relationship with the defining walls of the channels 6,7, accommodating the target electrode or electrodes, it is also possible to give the target electrodes different configurations and positions. Thus, the target electrodes of all embodiments may comprise electrically conductive or semi-conductive surfaces arranged in the close proximity of or directly on the inner surface of the channel walls. These target-electrode surfaces may therewith be earthed so as to obviate all insulation and over-spark problems, in which case the whole of the high voltage potential will lie on the corona electrode. Since, however, as mentioned in the aforegoing, it is possible with an arrangement constructed in accordance with the invention, to operate with a relatively moderate potential difference between corona electrode and target electrode and, despite this, with a significant distance between corona electrode and target electrode, the fact that the corona electrode is placed on the whole of the high voltage potential relative to earth need not result in insurmountable insulation or spark-over problems. Such target electrodes arranged on or closely adjacent the inner surface of the channel walls may, however, also have a potential other than earth potential, similar to the aforedescribed embodiments, in which case the channel walls must, of course, be electrically insulated. In the case of an arrangement in which target electrode surfaces are applied on or closely adjacent the inner surface of the channel walls, thin-gauge electrically insulated electrode elements can be arranged parallel with and centrally of the airflow channels, in a manner similar to the target electrodes M of the embodiment illustrated in FIGS. 2-9, these electrically insulated electrode elements being charged electrostatically and forming, together with the target electrodes at the channel walls, capacitor separators for effective precipitation of aerosol contaminants in the airflow.

FIG. 13 is a schematic, sectional view, similar to the section shown in FIG. 6, of an alternative, exemplifying embodiment of the aforedescribed kind, which embodiment was found extremely effective when tested in practice. The arrangement illustrated in FIG. 13 is substantially of the same configuration as the arrangement illustrated in FIGS. 6, 7, having a square or rectangular outer shape and a rectangular inlet opening or port 2, which extends across the whole of the vertical extension of the arrangement and from which the inflowing air is branched through substantially 90° out to two oppositely directed airflow channels 6 and 7. The corona electrode K has the form of a wire and is arranged in the centre plane passing through the inlet opening 2 together with a screening electrode S in the aforedescribed manner. Each of the channels 6, 7 has arranged therein a target-electrode arrangement comprising three, thin-gauge target electrode elements M, of which two form the outer side walls of the respective airflow channel 6, 7, whereas the third target electrode element M extends parallel with and substantially centrally between said outer side walls. All target electrode elements M are earthed together with one terminal of the voltage source 4, whereas the corona electrode K together with the screening electrode S is connected to the other terminal of the voltage source. In the case of this embodiment, the wall 5 which divides and deflects the air-flow entering through the inlet opening 2 is advantageously insulated electrically. The housing walls 1 defining the inlet opening 2 may be electrically insulated or electrically conductive and earthed together with the grid 8 covering the inlet opening 2. A flow of air is driven in through the opening 2 and out through the two oppositely directed channels 6, 7, in the same manner as that described with reference to the arrangement illustrated in FIGS. 6, 7. The air-flow channels 6, 7 have arranged therein further thin-gauge electrically conductive or semi-conductive electrode elements 10, which are located centrally between the target electrodes M. These further electrode elements 10 are electrically insulated relative to the surroundings, e.g. mounted in the electrically insulated end-walls of the housing, and when the arrangement is in operation will be charged electrostatically to adopt a voltage of the same polarity as the corona electrode K in relation to the target electrode elements M. Together with the target electrode elements M, these further electrode elements 10 form capacitor separators of principally conventional kind which engender effective precipitation of aerosol contaminants carried by the air-flow onto the target electrode elements M. The edges of the further electrode elements 10 located nearest the corona electrode K can be provided with outwardly projecting fingers or tabs which promote the desired electrostatic charge on the electrode elements 10. The target electrode elements M and the further electrode elements 10 in each of the air-flow channels 6, 7 may be integrally constructed to form a single readily detached unit capable of being easily removed for cleaning or replacement, when the target electrode elements M are excessively soiled by the airborne contaminants.

An arrangement constructed according to FIG. 13 and having external dimensions of 400×400 mm and the remaining dimensions shown in the drawing in millimeters, has been tested in practice with a corona voltage 20 kV and a corona current of approx. 8 $\mu$A. There was obtained an air throughput of approximately 60 m$^3$/h and more than 99% of the aerosol contaminants carried by the air were extracted therefrom.

It will be understood that an arrangement having the principle construction described with reference to FIG. 13 can also be given a rotational-symmetrical configuration in a similar manner to the arrangement illustrated in FIGS. 8, 9. Furthermore, it will be understood that the arrangement, irrespective of whether it is rotational-symmetrical or rectangular, can be configured in a manner in which the air-flow is deflected through an angle of less than 90°, instead of almost 90°, for example similar to the arrangements illustrated in FIGS. 2, 3 or 4, 5.

It will be understood from the aforegoing that an arrangement, in which target electrode surfaces are applied on or located closely adjacent the inner surface of the channel walls, does not necessarily require the provision of further target electrodes centrally in the channels nor the provision of additional electrode elements 10, as in the case of the embodiment illustrated in FIG. 13. Furthermore, target electrode surfaces applied on or located closely adjacent the channel walls may, of course, also be used in other inventive embodiments, such as the embodiments illustrated in FIGS. 2-11 for example. As beforementioned, in this case it is not necessary to earth the target electrodes, but these electrodes may, alternatively, be connected to a potential different to earth potential, in which case the channel walls must, of course, be insulated electrically. It will also be understood that the target electrodes of the inventive arrangement may have other configurations than those described and illustrated. For example, the target electrodes need not comprise surfaces which extend parallel with the side walls of the air-flow channels. Instead, in the case of arrangements in which the air-flow channels have a rectangular cross-section, e.g. the channels of the embodiments shown in FIGS. 2, 3 or 6, 7 or 12, the target electrodes may comprise planar electrode elements positioned at right angles to the side walls of the air-flow channels, either with one or more mutually parallel electrode elements in each channel. In the case of arrangements constructed in accordance, e.g. with FIGS. 2, 6 or 12, such alternative target electrodes will be arranged parallel with the plane of the figures.

In order to enable the air flowing through an arrangement constructed in accordance with the invention to be cleansed of gaseous contaminants in addition to the aforesaid aerosol contaminants, the inner surfaces of the housing walls 1, 5 defining the channels 6, 7 may be coated with a layer of chemically active material which will absorb or catalytically decompose the gaseous contaminants concerned. Since the walls 1, 5 of an inventive arrangement may be electrically earthed, it is also relatively easy to cool or warm these walls in order to change the temperature of the through-passing air. As mentioned in the aforegoing, the corona discharge at the corona electrode produces gaseous substances, and ozone and nitrogen oxides in particular, which are harmful or irritating to people in the vicinity and the concentration of which in the ambient air should not exceed certain limit values in environments in which people are found. An arrangement constructed in accordance with the invention enables a large part of these deleterious gases to be recovered and rendered harmless, by providing the partition wall 5 located opposite the inlet opening 2 with an opening 9 which is located axially opposite the corona electrode K and which has a configuration and extension similar to the corona electrode, as illustrated schematically and by way of example in FIG. 10 for arrangements of the kind illustrated in FIGS. 6-9. That part of the air-flow which passes in the immediate vicinity of the corona electrode and which contains the predominant part of the harmful gases engendered by the corona discharge will pass through this opening 9. The air passing through the opening 9 can be recovered on the rear side of the partition wall 5, so that the harmful gases carried by said air can be rendered safe. This can be effected by releasing this air to atmosphere outside the building, or the air can be passed through a suitable filter in which the harmful gases are absorbed or catalytically decomposed to safe form. Such a filter can be arranged in the space located behind the wall 5, downstream of the opening 9. It will be understood that this arrangement can also be embodied in all other embodiments of the invention, for example the embodiments illustrated in FIGS. 2-5, 11, 12 and 13.

FIGS. 14 and 15 illustrate schematically and by way of example a number of embodiments in which that part of the air-flow which is laden with harmful gases is removed from the immediate vicinity of the corona electrode in the aforedescribed manner.

The arrangement illustrated in FIG. 14 is constructed essentially in the same manner as the arrangement illustrated in FIGS. 2 and 3, however with the difference that the target electrode of the FIG. 14 embodiment comprises electrode surfaces M arranged on the inner surfaces of the side walls of channels 6 and 7, and the housing 1 and the partition wall 5 are insulated electrically. Located in the partition wall 5, opposite the corona electrode K, is an opening 9 of similar shape and extension as the wire-like corona electrode K. The volume of air that has passed in the immediate vicinity of the corona electrode K and which therefore contains the harmful gases engendered by the corona discharge will pass through the opening 9. Thus, this air volume will flow into the space located rearwardly or inwardly of the partition wall 5 and can be cleansed of said harmful gases with the aid of a suitable filter 11.

Because target electrode surfaces M of this embodiment are located relatively close to the opening 9, it is ensured that the air volume laden with harmful gases will actually flow into the opening 9.

FIG. 15 illustrates schematically, and by way of example, an arrangement of the same principle construction as the arrangement illustrated in FIGS. 4, 5 with the exception that the flow channels 6, 7 of the FIG. 15 embodiment are of rectangular cross-section and the corona electrode K is therefore in the form of a wire. For the same reasons, the target electrodes M of the FIG. 15 embodiment have the form of flat, thin-gauge electrode elements. Similar to the aforedescribed, the partition wall 5 is provided with an opening 9 which is positioned axially opposite the corona electrode K and which has a similar configuration and extension as said corona electrode. The air volume which has passed in the immediate vicinity of the corona electrode K and which therefore carries the harmful gases engendered by the corona discharge will pass through the opening 9. These harmful gases can be removed by passing the air volume entering through the opening 9 through a suitable filter, in the aforedescribed manner. Because the partition wall 5 of this embodiment is electrically conductive and earthed, that part of the wall 5 located nearest the opening 9 will draw a given, small corona current when the distance between the opening 9 and the corona electrode K is suitably adapted therefor. This corona current assists effectively in driving the air volume passing nearest to the corona electrode K in through the opening 9. A further thin-gauge electrode element 11 may be provided rearwardly or downstream of the opening 9 and connected to a potential of the same sign as the potential of the corona electrode K. This electrode element 11 forms, together with the earthed partition wall 5, a capacitor separator in which aerosol contaminants present in the air flowing through the opening 9 can precipitate out. In this case, the contaminants are precipitated onto the partition wall 5. Such aerosol contaminants are therewith prevented from entering and contaminating the filter used to render safe the harmful gases engendered by the corona discharge.

It will be understood that a number of the inventive arrangements may be combined to form a large unit.

FIG. 11 thus illustrates schematically, by way of example, two or more arrangements of the kind illustrated in FIGS. 2, 3 placed axially in line, so as to be through-passed by one and the same air-flow. Such an arrangement affords the advantage that the partition wall 5, whose outer surfaces may be electrically conductive and the inner surfaces thereof electrically insulated, will effectively screen the downstream corona electrode K so as to prevent effectively an ion current moving in the upstream direction, which is not desired.

FIG. 12 illustrates schematically two arrangements of one of the embodiments illustrated in FIGS. 6–9 placed back-to-back with the inlet openings of said arrangements facing in mutually opposite directions. This combination of arrangements may, of course, also be effective with the embodiment illustrated in FIG. 13.

It will be understood that the invention is not restricted to the aforedescribed and illustrated exemplifying embodiments thereof, and that the illustrated and described embodiments may be modified within the scope of the invention and that several of the inventive arrangements can be combined to form a larger air-treatment assembly.

We claim:

1. An arrangement for transporting and optionally, at the same time, cleansing air, comprising a corona electrode (K) at least one target electrode (M) spaced from said corona electrode, a d.c. voltage source (4), said corona electrode and said at least one target electrode being connected to respective terminals of said source, and in which arrangement the configuration of the corona electrode and the voltage of the voltage source are such that an ion-generating corona discharge occurs at the corona electrode, and further comprising a housing having housing walls (1,5) and an inlet opening (2) in which the corona electrode (K) is substantially centrally positioned, and an air-flow path which extends from said inlet opening (2) and in which said at least one target electrode (M) is positioned so as to be located at a considerable distance from and symmetrically in relation to the centre line passing through the inlet opening (2), so that lines extending between the corona electrode (K) and said at least one target electrode (M) define a substantial angle ($\alpha$), characterized in that the housing is configured so that the airflow path downstream of the inlet opening (2) and the corona electrode (K) branches outwardly towards said at least one target electrode (M) to form at least one air-flow channel (6,7), in which each channel contains the respective target electrode (M) and in which each channel is located at a distance from the centre line through the inlet opening (2), so that air entering through the inlet opening (2) is forced out towards said at least one target electrode (M) and so that at least the major part of the air is prevented by the housing wall (5) from continuing straight forwards along the extension of the centre line through the inlet opening (2).

2. An arrangement according to claim 1, characterized in that said angle (c$\alpha$) defined by lines drawn between the corona electrode (K) and said at least one target electrode (M) is at least 60°.

3. An arrangement according to claim 1, characterized in that the inlet opening (2) has a substantially rectangular cross-section; and in that the corona electrode (K) is of an elongated and wire-like configuration and is arranged in the centre plane through the inlet opening (2) extending perpendicularly to the centre line through the inlet opening, and in that the air-flow path downstream of the corona electrode branches out on both sides of the centre plane through the inlet opening (2) into two airflow channels (6, 7) of substantially rectangular cross-section, each of said channels accommodating a respective target electrode (M) having an extension substantially parallel with the walls of said air-flow channels.

4. An arrangement according to claim 3, characterized in that the two air-flow channels (6, 7) containing the target electrodes (M) extend substantially parallel with the centre plane through the inlet opening (2).

5. An arrangement according to claim 3, characterized in that the two air-flow channels (6, 7) containing the target electrodes (M) diverge in mutually opposite directions from the centre plane passing through the inlet opening (2).

6. An arrangement according to claim 5, characterized in that the divergent directions of the two air-flow channels (6, 7) form therebetween an angle which coincides substantially with the angle ($\alpha$) subtended by lines extending from the corona electrode (K) to the two target electrodes (M).

7. An arrangement according to claim 3, characterized in that the two air-flow channels (6, 7) containing the target electrodes (M) extend in mutually opposite directions substantially perpendicularly to the centre plane passing through the inlet opening (2).

8. An arrangement according to claim 1, characterized in that the inlet opening (2) is substantially circular, in that the corona electrode (K) comprises a short wire-like or needle-shaped electrode extending axially substantially along the centre line passing through the inlet opening (2), and in that the air-flow path downstream of the corona electrode branches substantially conically, relative to said centre line, into an air-flow channel (6) of substantially annular cross-section and concentrically surrounding said centre line, and in that said channel (6) has provided therein a target electrode (M) of substantially annular extension.

9. An arrangement according to claim 8, characterized in that the channel (6) containing the target electrode (M) and having a circular cross-section extends substantially parallel with the centre line passing through the inlet opening (2).

10. An arrangement according to claim 8, characterized in that the air-flow channel (6) having a circular cross-section and containing the target electrode (M) diverges conically from the centre line passing through the inlet opening (2).

11. An arrangement according to claim 10, characterized in that the direction in which the air-flow channel (6) extends coincides substantially with the direction from the corona electrode (K) to the target electrode (M).

12. An arrangement according to claim 8, characterized in that the air-flow channel (6) having a circular cross-section and containing the target electrode (M) extends radially outwards in directions substantially perpendicularly in relation to the centre line passing through the inlet opening (2).

13. An arrangement according to claim 3, characterized in that each of the target electrodes (M) includes a substantially thin-gauge electrode element arranged substantially parallel with and substantially centrally between the walls of the respective air-flow channel (6, 7).

14. An arrangement according to claim 9, characterized in that the target electrode (M) is substantially cylindrical and is arranged substantially parallel with and substantially centrally between the walls of the airflow channel (6) of circular cross-section.

15. An arrangement according to claim 10, characterized in that the target electrode (M) includes a thin-gauge, frusto-conical electrode element arranged substantially parallel with and substantially centrally between the walls of the conically diverging air-flow channel (6) of circular cross-section.

16. An arrangement according to claim 12, characterized in that the target electrode (M) has an annular configuration and is arranged parallel with and centrally between the walls of the air-flow channel (6) which extends radially outwards in directions substantially perpendicularly in relation to the centre line passing through the inlet opening (2).

17. An arrangement according to claim 13, characterized in that each of the thin-gauge target electrodes (M) extend over the major part of the length of the respective air-flow channel (6, 7) as seen in the direction of air-flow.

18. An arrangement according to claim 17, characterized in that the parts of the target electrodes (M) located nearest the corona electrode (K) are electrically conductive or semi-conductive and are connected to one terminal of the d.c. voltage source (4), and in that the remaining, larger part of the target electrodes (M) has a very high resistivity and is preferably antistatic.

19. An arrangement according to claim 3, characterized in that the target electrodes (M) include electrically conductive or semi-conductive surfaces arranged closely adjacent to or on the inner surfaces of the walls of the air-flow channels (6, 7) containing the target electrodes.

20. An arrangement according to claim 1, characterized in that the housing wall (5) located opposite the inlet opening (2) is provided with an opening (9) which is located axially downstream of the corona electrode (K) and which has much smaller dimensions than the inlet opening (2), said opening (9) being intended to be through-passed by the air-flow which passes in the immediate vicinity of the corona electrode (K) and which contains harmful gases engendered by the corona discharge.

21. An arrangement according to claim 1, characterized by a grid or net structure (8) which is spaced from the corona electrode (K) upstream thereof in a manner to prevent direct contact with the corona electrode.

22. An arrangement according to claim 1, characterized in that a screening electrode (S) connected to essentially the same potential as the corona electrode (K) is arranged upstream of said corona electrode.

23. An arrangement according to claim 1, characterized in that the corona electrode (K) and said at least one target electrode (M) are connected to potentials having opposite polarities relative to earth.

24. An arrangement according to claim 1, characterized in that the housing walls (1,5) are electrically conductive and earthed.

* * * * *